United States Patent [19]

Hamilton

[11] 4,277,044
[45] Jul. 7, 1981

[54] MECHANICAL COUNTERBALANCE

[75] Inventor: W. Duane Hamilton, Middletown, R.I.

[73] Assignee: American Optical Corporation, Southbridge, Mass.

[21] Appl. No.: 73,471

[22] Filed: Sep. 7, 1979

[51] Int. Cl.³ ............................................. F16M 13/00
[52] U.S. Cl. ................................. 248/571; 248/123.1; 248/292.1
[58] Field of Search ............... 248/571, 564, 565, 566, 248/562, 567, 583, 584, 585, 586, 588, 595, 593, 594, 592, 292.1, 325, 123.1, 364; 212/195, 196, 197

[56] References Cited

U.S. PATENT DOCUMENTS

| | | | |
|---|---|---|---|
| 2,179,357 | 11/1939 | Stava | 248/592 X |
| 2,648,146 | 8/1953 | Foster | 248/584 X |
| 2,784,962 | 3/1957 | Sherburne | 248/571 X |
| 3,003,737 | 10/1961 | Mehr | 248/592 X |
| 3,402,911 | 9/1968 | O'Neill | 248/325 |
| 3,498,577 | 3/1970 | Mehr | 248/585 X |
| 3,741,511 | 6/1973 | Streeter | 248/631 X |
| 3,860,208 | 1/1975 | Salter | 248/613 X |
| 3,880,393 | 4/1975 | Watson | 248/325 |

Primary Examiner—J. Franklin Foss
Attorney, Agent, or Firm—Alan H. Spencer

[57] ABSTRACT

An instrument supporting arm is consistently uniformly counterbalanced over its entire excursion of adjustment with springs and spring holder guided by cams which alter arm length-to-moment ratio and force angles to compensate for spring extension forces.

8 Claims, 2 Drawing Figures

4,277,044

MECHANICAL COUNTERBALANCE

BACKGROUND OF THE INVENTION

1. Field of the Invention

Counterbalancing mechanisms with particular reference to a spring counterbalance for an adjustable instrument supporting arm.

2. Discussion of the Prior Art

Ophthalmic instrument supporting arms and the like which are raised and lowered on instrument stands to various working heights are commonly spring balanced in an intermediate position of adjustment. As the arm and instrument or other load carried thereby is raised or lowered, the springs are caused to extend or retract rendering the arm unbalanced and in need of friction breaking or other such means to maintain desired positions of arm adjustment above or below the intermediate or other preselected position of balance. Thus, manipulation of such an instrument supporting arm over the full excursion of its adjustment requires variable forces, the greatest usually being adjacent points where frictional breaking is maximum, i.e. at points furthest from actual balancing. This "feel" of unevenness of arm operation can be disconcerting to the practitioner desiring to avoid jerky or otherwise uneven arm adjustments particularly when aligning an ophthalmic instrument with the face or eyes of a patient.

Attempts to avoid the drawbacks of conventional spring biasing of instrument stand arms and the like have included the use of balancing weights and pulleys. While such means may offer relatively uniform counterbalancing at most positions of arm adjustment, their large space requirements and general ungainliness usually outweigh advantages.

An object of the present invention is to accomplish substantially constant counterbalancing of a spring biased instrument supporting arm over its entire excursion of adjustment.

More particularly, the objective is to provide spring counterbalancing of an instrument stand arm or the like with automatic compensation for inherent variations of spring extension forces.

Another object is to provide a mechanism for adjustable arm counterbalancing which is adaptable to light, intermediate or heavy load carrying apparatus.

Still another object is to accomplish the above with maximum mechanical simplicity and compactness.

Other objects and advantages of the invention will become apparent from the following description.

SUMMARY OF THE INVENTION

The foregoing objects and corollaries are accomplished with a counterbalance for a pivotally adjustable load carrying arm wherein the counterbalance utilizes one or more extension springs. Each of the springs has one of its ends connected to the arm supporting mechanism, e.g. the base of an instrument stand, and its opposite end attached to the arm with means adapted to alter the arm length-to-moment ratio and spring force angle according to variations in spring extension forces, i.e. each spring is attached to a bar that is cam actuated closer to the pivot point of the arm as the spring becomes extended and vice versa.

Details of the invention will become apparent from the following description when taken in conjunction with the accompanying drawings.

IN THE DRAWINGS

FIG. 1 is a fragmentary side view of an instrument stand incorporating a preferred embodiment of the invention; and FIG. 2 is a rear view of the instrument stand shown in FIG. 1.

DESCRIPTION OF THE PREFERRED EMBODIMENTS

Figure 1:
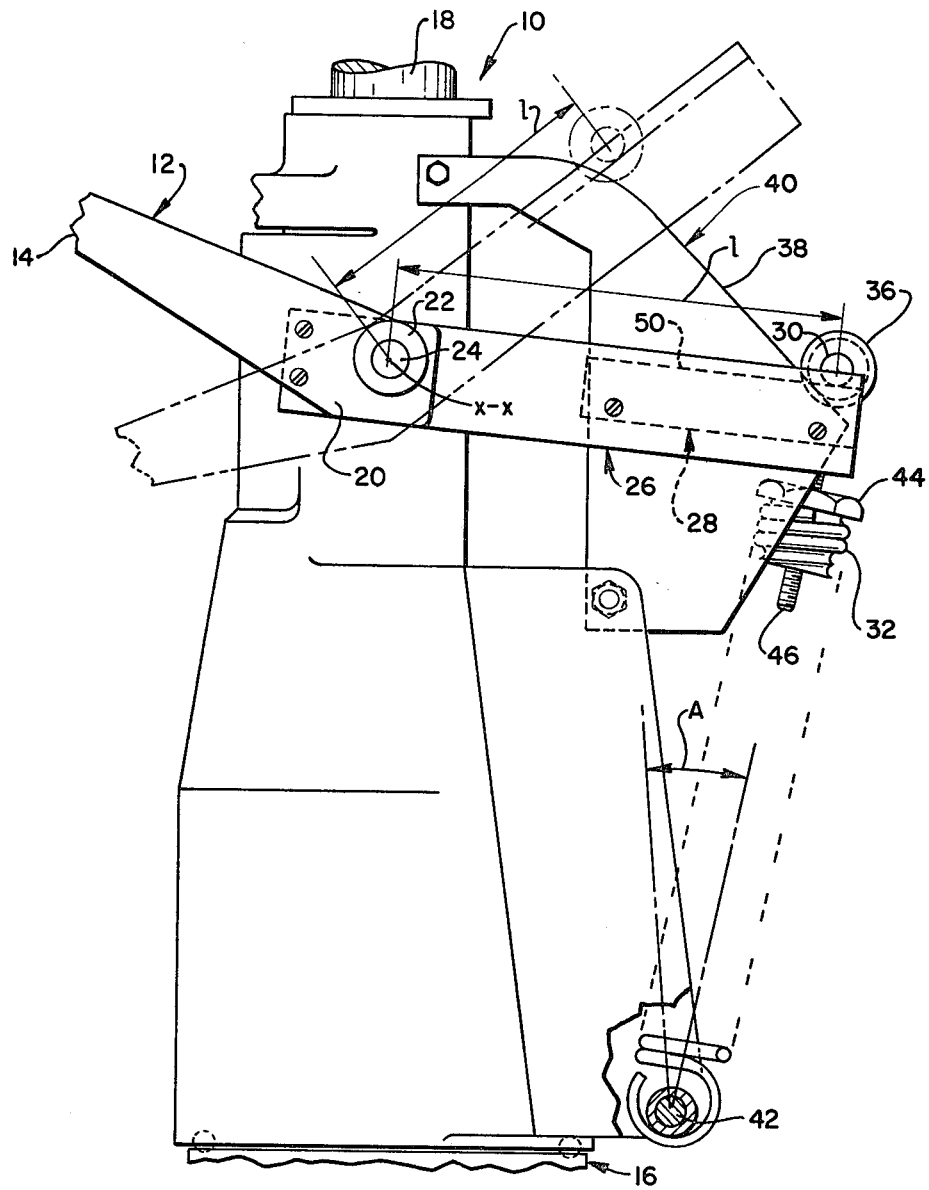
Figure 2:
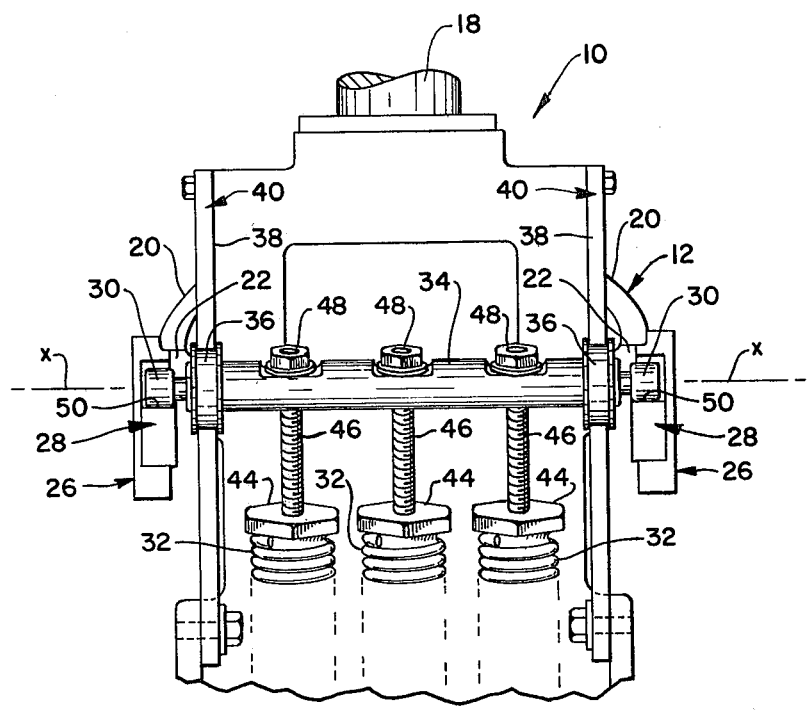

In FIGS. 1 and 2, stand 10 is illustrated as having instrument supporting arm 12 pivotally mounted thereon for movement of its distal load carrying end 14 upwardly or downwardly as needed. In conventional fashion, stand 10 may be rotated upon its base 16 thereby providing for universal adjustment of end 14 of arm 12.

With stand 10 used in conjunction with ophthalmic refracting equipment, some of which may be supported by center post 18 or other means, arm 12 may be used to carry a slit lamp and/or tonometer (not shown). It is to be understood, however, that stand 10 and arm 12 may alternatively be used in the practice of dentistry and/or to support various other medical, laboratory or industrial examining or testing instruments and/or tools. In any case, stand 10 is to be considered as exemplary only of means for supporting a distally loaded arm 12 or its equivalent which, in turn, is counterbalanced according to the present invention.

In the presently illustrated example of arm 12, its proximal portion 20 is bifurcated to fit about stand 10 and bossed at ends 22 which are pivotally connected to pivot rod 24. Separate pivot studs extending outwardly from opposite sides of stand 10, along axis x—x, may be substituted for rod 24.

Each end 22 of arm 12 is provided with an extension 26 carrying a cam 28 against which followers 30 are drawn by springs 32. One end of each of springs 32 is fixed to rod 34 (FIG. 2) and followers 30 are pivotally mounted, one at each end of the rod, e.g. as rollers.

Inwardly of each of followers 30 and similarly rotatably mounted on rod 34 is a second cam follower 36, e.g. a sheave. Followers 36 engage tracks 38 of adjacent cams 30 which, in turn, are bolted or otherwise fixed to stand 10.

Springs 32 functioning to draw cam followers 30 and 36 against respective cams 28 and 40 are distally fixed to stand 10 adjacent base 16 by means of bar 42 about which each is hooked, e.g. as shown in FIG. 1.

Threaded spring caps 44 receive tie bolts 46 with which the tension in each of springs 32 and the cumulative pulling force of cam followers 30, 36 against cams 28, 40 may be adjusted. By threading bolts 46 into spring caps 44 with rotation of heads 48, corresponding ends of springs 32 may be drawn toward rod 34 to increase spring tension while reverse threading will decrease tension.

With arm 12 in a given position, preferably in the up position illustrated by full lines in FIG. 1, spring 32 tension is adjusted to the point of counterbalancing the distal portion 14 of arm 12 and its load, i.e. the weight of instruments or the like carried thereby. When end 14 of arm 12 is lowered, rod 34 becomes raised by followers 30 which move along cams 28 toward pivot axis x—x (see broken line illustration in FIG. 1). At the same time, rod 34 is moved closer to pivot axis x—x by movement of cam followers 36 along tracks 38 of cams 40. Thus, compensation for spring extension forces is accomplished by change of arm length-to-moment ratio together with change of spring force angle A as end 14 of arm 12 is raised and lowered.

The presently illustrated straight edges 50 of cams 28 and non-linear tracks 38 of cams 40 accomplish constant counterbalancing of arm 14 throughout its entire excursion of adjustment. It should be understood, however, that various modifications and adaptations of this precise form of the invention may be made without departure from the scope of the invention. Present illustrations are to be considered as exemplary and not delimiting of the invention.

I claim:

1. A mechanism for counterbalancing a distally loaded object carrying arm which is proximally pivoted upon a support therefor, said mechanism comprising:
   an extension of said arm having thereon a first cam disposed oppositely of said distal loading of said arm;
   a first cam follower engaging said first cam;
   a second cam fixed to said support for said arm;
   a second cam follower engaging said second cam;
   means carrying said first and second cam followers;
   spring means having one end fixed to said support and an opposite end connected to said carrying means;
   said first cam and first follower being constructed and arranged to effect extension of said spring means when said distal end of said arm is lowered and vice versa; and
   said second cam and second follower being constructed and arranged to simultaneously move said opposite end of said spring means toward the location of proximal pivoting of said arm when said distal end of said arm is lowered and vice versa;
   whereby arm length-to-moment ratio and spring force angle are altered to compensate spring extension forces.

2. A mechanism according to claim 1 including means for adjusting the tension of said spring means independently of said extension thereof by said first cam surface and follower.

3. A mechanism according to claim 2 wherein said means carrying said first and second cam followers includes a rod and said adjusting means includes a bolt connecting said opposite end of said spring means to said rod.

4. A mechanism according to claim 1 wherein said first cam surface is substantially linear and said second cam provides a non-linear path along which said second follower moves to ring said spring means toward said location of said pivoting of said arm.

5. A mechanism for counterbalancing a distally loaded bifurcated object carrying arm which is proximally pivoted upon a support therefor, said mechanism comprising:
   an extension of each bifurcation of said arm having thereon a first cam disposed oppositely of said distal loading of said arm;
   a first cam follower engaging said first cams;
   a second cam including a pair of cam components, one fixed to said support for said arm adjacent each of said first cam surfaces;
   a second cam follower engaging each of said pair of fixed cam components;
   means carrying said first and second cam follower;
   spring means having one end fixed to said support and an opposite ends connected to said carrying means;
   said first cams and first followers being constructed and arranged to effect extension of said spring means when said distal end of said arm is lowered and vice versa; and
   said second cams and second followers being constructed and arranged to simultaneously move said opposite end of said spring means toward the location of proximal pivoting of said arm when said distal end of said arm is lowered and vice versa;
   whereby arm length-to-moment ratio and spring force angle are altered to compensate spring extension forces.

6. A mechanism according to claim 5 wherein said means carrying said cam followers includes a rod having one of each of said first and second followers rotatably mounted upon each end thereof.

7. A mechanism according to claim 6 wherein said spring means includes a plurality of tension springs connected to said rod.

8. A mechanism according to claim 7 wherein said connection of said springs to said rod is accomplished with a threaded bolt in each case.

* * * * *